March 6, 1951   J. D. WOOD   2,544,519
TIME DELAY CIRCUIT BREAKER
Filed Jan. 24, 1948

INVENTOR.
BY Joseph D. Wood
attorneys

Patented Mar. 6, 1951

2,544,519

UNITED STATES PATENT OFFICE 2,544,519

TIME DELAY CIRCUIT BREAKER

Joseph D. Wood, Upper Darby, Pa., assignor to ITE Circuit Breaker Company, Philadelphia, Pa., a corporation of Pennsylvania Application January 24, 1948, Serial No. 4,181

6 Claims. (Cl. 175—294)

My present invention relates to a novel circuit breaker for use in a selective system, such as disclosed in application Serial No. 522,725, now Patent No. 2,439,165, assigned to the present assignee.

In such selective systems, provision is made for long and short time delay in the operation of the circuit breaker in response to various types of fault currents, the time delay for successive breakers in the system being different so that if the breaker nearest the fault can effectively open the line in response to such fault, no other breaker opens, thus leaving the remainder of the system in operation.

Selective tripping systems, as those described in application Serial No. 522,725, filed February 17, 1944, now Patent No. 2,439,165, are so arranged that the circuit breakers have a time delay in opening at all current values up to the interrupting capacity of the circuit breaker. Even in a cascaded arrangement of circuit breakers where an instantaneous trip is provided, the trip point of this instantaneous trip is set so high that a time delay is imposed at extremely high values of current.

Circuit breakers that are required to handle high short circuit currents of 25,000 amperes or more perform very well if the circuit breaker is closed when the fault occurs. With the breaker latched in the closed position, the time delay does no harm as the circuit breaker will carry this current for some time and then interrupt the circuit.

If, however, a fault exists on the line and an attempt is made to close the circuit breaker against fault current, then many circuit breakers will be severely damaged. This is because the magnetic forces acting on the moving contact due to the short circuit current, tending to force the contacts to the open position, are greater than the force of the closing force of the closing mechanism.

To overcome this condition it is not possible to merely provide more closing force to overcome the opening forces. The closing force is applied whether a fault exists on the line or not. If sufficient closing force were provided to close against a fault, then the closure in the absence of a fault would cause mechanical injury to the breaker.

If a circuit breaker is provided with an instantaneous trip, it has been found that it makes little difference whether sufficient closing force is provided or not. The circuit breaker trips open and interrupts the circuit in a normal manner. If the circuit breaker has a time delay trip and if the closing mechanism does not have sufficient closing force to close against the fault current, then the circuit breaker may be severely damaged by an attempt to close the circuit breaker against a fault, which results in the contacts chattering for a period of the time delay.

A solution to this problem would be to provide the circuit breaker with a time delay at all times except during the closing stroke and to provide an instantaneous trip during the closing stroke only.

The inventive concept, therefore, of my invention resides in providing means which in effect render all the time delay mechanism of the circuit breaker ineffective during the closing of the breaker.

Accordingly an object of my invention is to provide a novel circuit breaker having time delay mechanism for controlling the tripping of the circuit breaker and means for providing instantaneous interruption of the breaker in the event that the breaker should close on a fault current.

A further objection of my invention is to provide a novel circuit breaker having electromagnetic means which become effective for providing instantaneous tripping of the circuit breaker during manual closing of the breaker.

Still another object of my invention is to provide a circuit breaker having a long and short time delay mechanism with an electromagnetic instantaneous tripping mechanism effective only during the closing period of the breaker.

These and many other objects of my invention will become apparent from the following description and drawings in which Figure 1 illustrates schematically a preferred form of the control mechanism of a circuit breaker including my invention.

Figure 1:
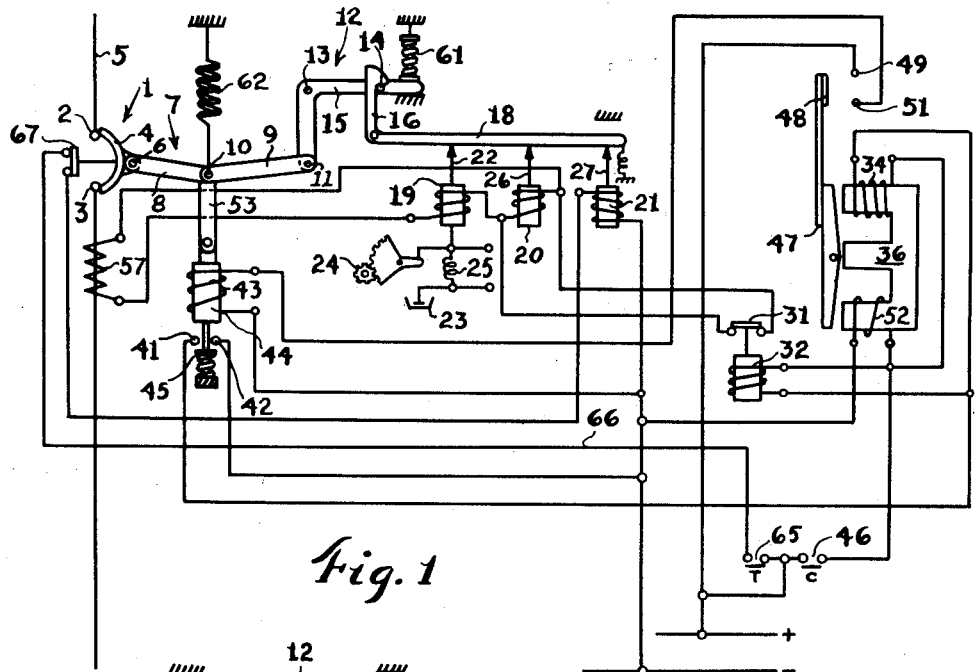

The circuit breaker 1 provided with the contacts 2 and 3 is bridged by the arm 4 and controls the line 5. The bridging contact arm 4 is connected through the pin 6 to the toggle mechanism 7 comprising the links 8 and 9 pivotally connected at 10.

The link 9 is connected through pin 11 to the bell crank 12 having a fixed pivot point 13 and carrying a pin 14 on its arm 15 which acts as a latching mechanism for the latch member 16 having a fixed pivot 17 and having an arm 18 adapted to be engaged by the plungers of electromagnets 19, 20 and 21 in a manner to be described.

Electromagnet 19 controls the operation of plunger 22 in response to its energization, the time of operation of plunger 22 being controlled by the long time delay mechanism 23, for providing time delays of the order of seconds in response to excessive overloads, and the short time delay mechanism 24 for providing time delays of the order of 2 to 10 cycles in response to short circuits, connected to each other through spring 25, and although shown here only schematically (as is the remainder of the mechanism) is more fully illustrated in application Serial No. 522,725.

Electromagnet 20 controls the operation of its plunger 26 to effect instantaneous operation in a manner to be described, and electromagnet 21 controls its plunger 27 for operating in response to a manual tripping operation.

As illustrated, the instantaneous trip magnet 20 is normally provided with a by-pass circuit around its winding at the armature 31 of electromagnet 32 and accordingly is in a non-operating circuit during normal operations. As will be explained more fully hereafter, however, it comes into operation during the closing operation of the circuit breaker.

Electromagnet 32, it will be noted, is connected in parallel with the winding 34 of the relay 36 and is energized in response to a closing operation in order to open the by-pass of the relay 20.

The circuit for relay windings 32 and 34, however, is controlled by the contacts 41 and 42 of the closing magnet 43. When the plunger 44 of magnet 43 is in its uppermost position, as shown by Figure 2, member 45 bridges the contacts 41 and 42 and prepares thereby an energizing circuit for the windings 32 and 34.

With this brief description of the apparatus, the operation of my invention will now be clear from the following.

Figures 2, 3:
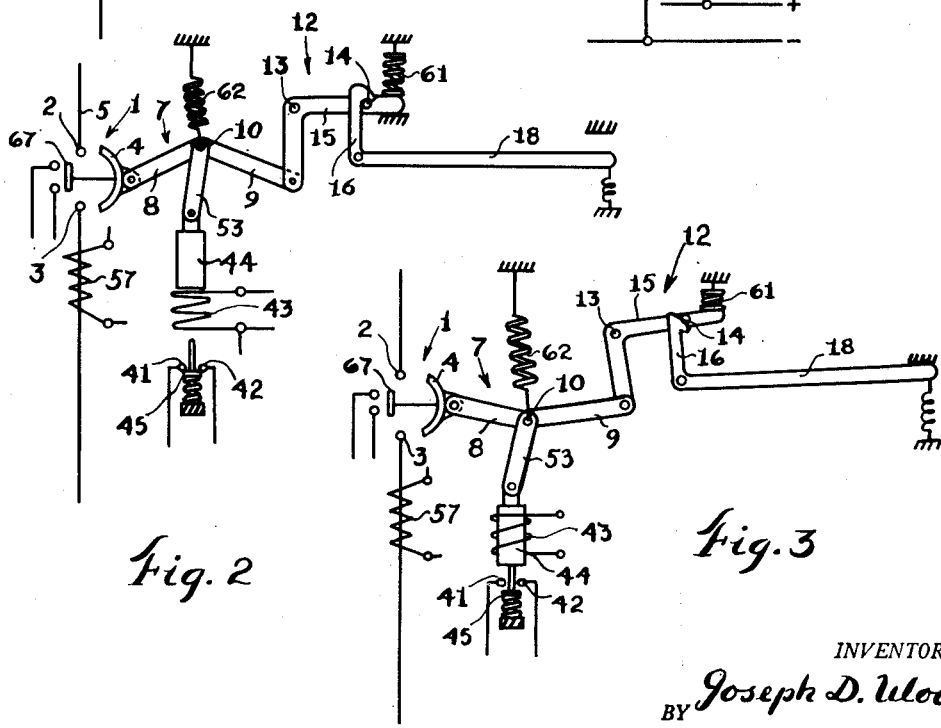
Figure 2 illustrates schematically the circuit breaker of Figure 1 in the re-set position ready to be closed.
Figure 3 illustrates schematically the circuit breaker of Figure 1 in the tripped or open position.

Assuming that the circuit breaker is in open position, Figure 2; that is, that the bridging contact 4 is disconnected from contacts 2 and 3. Contact 45 bridges the contacts 41 and 42 and a circuit is thus prepared for the windings 32 and 34.

Upon the closing of the contact 46, an obvious energizing circuit is completed for the windings 34 and 32. Winding 32 upon energization operates its plunger 31 to remove the bridging circuit around the winding of relay 20. This places the winding of relay 20 in series with the winding of relay 19 and across the current transformer 57 in the line circuit 5.

Energization of winding 34 will operate the armature 47 about its pivot in a clockwise direction toward the upper pole face and the bridging member 48 will bridge the contacts 49 and 51.

The closing of the contact 46 also completes an energizing circuit for the winding 52 of the relay 36 but inasmuch as the winding 34 has more ampere turns, the magnetic pull of the latter is greater than that of winding 52 and accordingly the armature 47 is rocked clockwise.

The closing of the contacts 49 and 51 by the bridging member 48 completes an energizing circuit for the closing magnet 43. Energization of the closing magnet 43 results in the movement of the plunger 44 downwardly carrying with it through the links 53 the toggle link members 8 and 9 from the position of Figure 2 to the straightened out position of Figure 1 and contacts 2 and 3 are closed by the bridging member 4 to the slightly over-center position shown in Figure 1 in the drawings.

The toggle 8 and 9 being over center maintains the breaker 1 in the closed position against the bias of spring 62.

The bell crank 12 is held against rotation in a counterclockwise direction by the latch 14. Should the electromagnets 19, 20 or 21 be sufficiently energized to cause tripping, their cores 22, 26 or 27 are raised, engaging the arm 18 of the latch 16 causing it to rotate in a counterclockwise direction and to disengage from the latch pin 14. The crank 12 is then free to rotate counterclockwise and permit the opening of the breaker.

During the period while the circuit breaker was being operated to closed position, as above described, relay 32 was energized over the circuit including contacts 41 and 42 of the closing magnet 44. The energization of relay 32 operated the contact 31 to the open position and accordingly, as already stated, the instantaneous trip relay 20 was connected in series with the time delay trip coil 19 and both were connected across the current transformer 57.

If, therefore, upon the closing of the contacts a fault current flowed in the line 5, the voltage induced in the transformer 57 results in an energization of the instantaneous trip coil 20 which thereupon operates its plunger 26 to rock the lever arm 18 about its pivot 17 causing a disengagement of the latch 14 from the member 16. The bias of spring 62 and the straightened out links 8 and 9 will thereupon operate the bell crank 15 counterclockwise about its pivot 13 and the circuit breaker 1 will be operated to the disengaged position.

It will be noted that upon closing of the circuit breaker, the energizing circuit for the relay 32 is opened due to disengagement of the contacts 41 and 42 by the bridging member 45, as the toggle 7 moves to the position shown in Figure 1. However, a sufficient time interval is involved due to the fact that contacts 41 and 42 remain closed until the toggle 7 passes over center, so that the de-energization of relay 32 and therefore the bridging of trip magnet does not occur until an instant after the circuit breaker is closed and this time interval is sufficient to provide instantaneous trip in response to a short circuit.

The opening of contacts 41 and 42 opens the circuit for winding 34 and the energized winding 52 operates armature 47 in a counterclockwise direction. That is to say, after the contacts of the circuit breaker have been closed, the relay 20 has sufficient time to operate to effect instantaneous tripping in response to fault currents before the de-energization of relay 32 can effect a closing of armature 31 to bridge the winding 20.

As will now be clear from the above description, the circuit breaker here described is provided with an instantaneous trip during the closing of the breaker from the control switch 46.

At the same time, when the breaker is closed and connected in a system such as described in the above referred to pending application on sequential tripping, a fault current will induce current in the current transformer 57 and only the relay 19 will be responsive to such current to operate its plunger 22 and through the arm 18 about its pivot 17 for unlatching the circuit breaker.

The operation of the plunger 22, however, is provided with a time delay through the spring
25 by the ratchet mechanism 24, which is here a
schematic illustration of a short time delay device. As will be understood, any time delay device such as disclosed in the above parent application may be employed. A long time overload current device is also provided at 23 for controlling the operation of the plunger 22.

Thus, in the event of a short circuit current, a short time delay in the operation of the member 18 is effected and in the case of overload, a long time delay in its operation is effected.

During this condition, the winding of relay 20 is by-passed over the armature 31 and in engagement with its front contact.

When the circuit breaker is in its closed position, it may be desirable to trip the circuit breaker manually or under manual control at the location. To this end, a trip contact 65 is provided which when closed provides an energizing circuit from the source of supply over the trip contact 65 and the conductor 66 and the closed contacts at 67 which are connected mechanically to the circuit breaker mechanism and close only when the circuit breaker is closed, through the winding of the relay 21 back to the source of supply.

Energization of relay 21 will operate plunger 27 to operate member 18 about its pivot 17 for effecting a tripping of the circuit breaker.

In the foregoing I have described my invention solely in connection with specific illustrative embodiments thereof. Since many variations and modifications of my invention will now be obvious to those skilled in the art, I prefer to be bound not by the specific disclosures herein contained, but only by the appended claims.

I claim:

1. In a circuit breaker having a pair of cooperable contacts, mechanism for maintaining said contacts in engagement, a trip device including a latch for controlling said mechanism, an electromagnet responsive to current conditions in the circuit protected by said circuit breaker for controlling the operation of said latch to permit disengagement of said contacts in response to predetermined circuit conditions, long and short time delay apparatus for controlling the operation of said trip mechanism, a closing magnet, a manually controlled circuit connection for energizing said closing magnet, a second electromagnet, circuit connections for said second electromagnet for normally rendering said second electromagnet non-responsive to fault currents, and electrical means controlled by said manually controlled circuit when said closing magnet is energized for changing the circuit connections of said second electromagnet to render it responsive to fault currents only during the closing period of said circuit breaker for controlling the operation of said trip mechanism in response to fault currents to effect instantaneous tripping of said circuit breaker.

2. In a circuit breaker having a pair of cooperable contacts, latching mechanism for latching said contacts in engaged position, a closing magnet, a manually controlled circuit connection for energizing said closing magnet, an electromagnet having a long time delay operable in response to overload and a short time delay operable in response to short circuit currents for tripping said latching mechanism to effect disengagement of said contacts, and a second electromagnet, circuit connections for said second electromagnet for normally rendering said second electromagnet non-responsive to fault currents, and electrical means controlled by said manually controlled circuit when said closing magnet is energized for changing the circuit connection of said second electromagnet to render it responsive to fault currents for effecting instantaneous trip of said circuit breaker, and mechanism controlled by manually controlled circuit connections for preventing re-energization of closing magnet in the event said circuit breaker contacts are tripped immediately on the closing of said contacts.

3. In a circuit breaker having a pair of cooperable contacts, latching mechanism for latching said contacts in engaged position, a closing magnet, a manually controlled circuit connection for energizing said closing magnet, an electromagnet having a long time delay operable in response to overload and a short time delay operable in response to short circuit currents for tripping said latching mechanism to effect disengagement of said contacts, a second electromagnet, circuit connections for said second electromagnet for normally rendering said second electromagnet non-responsive to fault currents, and electrical means controlled by said manually controlled circuit when said closing magnet is energized for changing the circuit connection of said second electromagnet to render it responsive to fault currents for effecting instantaneous trip of said circuit breaker, and a relay having an armature in said closing magnet circuit, said relay being energized by said manually controlled circuit connection and controlling energization of said closing magnet, said relay having two windings, the first of which is energizable only when said contacts are engaged and the second of which is energized solely by said manually controlled circuit connection, said second winding when energized alone operating its armature to open the energizing circuit for said closing magnet.

4. In a circuit breaker having a pair of cooperable contacts, a spring connected to one of said contacts for biasing said contact to disengagement from the other of said contacts, a latch for normally maintaining said contacts in engagement against the action of said biasing spring, a first trip magnet, circuit connections for said trip magnet for energizing said magnet to release said latch in response to fault currents to permit disengagement of said contacts by said spring, a time delay mechanism for delaying the operation of said trip magnet in response to a fault current, a second trip magnet, circuit connections for said second trip magnet for energizing said second trip magnet to release said latch in response to fault currents to permit disengagement of said contacts by said spring, a by-pass from said last mentioned circuit connections around said second trip magnet for normally rendering said second trip magnet non-responsive to fault currents, electrical means for operating said contacts to engagement and circuit connections operated simultaneously with said electrical means for removing said by-pass to render said second trip magnet responsive to fault currents.

5. In a circuit breaker having a pair of cooperable contacts, a spring connected to one of said contacts for biasing said contact to disengagement from the other of said contacts, a latch for normally maintaining said contacts in engagement against the action of said biasing spring, a first trip magnet, circuit connections for said trip magnet for energizing said magnet to release said latch in response to fault currents to permit disengagement of said contacts by said spring, a time delay mechanism for delaying the operation of said trip magnet in response to a fault current, a second trip magnet, circuit connections for said second trip magnet for energizing said second trip magnet to release said latch in response to fault currents to permit disengagement of said contacts by said spring, a by-pass from said last mentioned circuit connections around said second trip magnet for normally rendering said second trip magnet non-responsive to fault currents, a closing magnet for operating said contacts into engagement, a circuit for said closing magnet, a relay having two windings of different strengths and an armature selectively attracted by said windings, manually controlled circuit connections for energizing one of said windings and for energizing the other of said windings when said contacts are disengaged, said second winding when energized operating said armature to close the circuit for said closing magnet, said manually controlled circuit connections being opened for said second winding and maintaining said first winding energized when said contacts are closed to open the circuit for said closing magnet.

6. In a circuit breaker having a pair of cooperable contacts, a spring connected to one of said contacts for biasing said contact to disengagement from the other of said contacts, a latch for normally maintaining said contacts in engagement against the action of said biasing spring, a first trip magnet, circuit connections for said trip magnet for energizing said magnet to release said latch in response to fault currents to permit disengagement of said contacts by said spring, a time delay mechanism for delaying the operation of said trip magnet in response to a fault current, a second trip magnet, circuit connections for said second trip magnet for energizing said second trip magnet to release said latch in response to fault currents to permit disengagement of said contacts by said spring, a by-pass from said last mentioned circuit connections around said second trip magnet for normally rendering said second trip magnet non-responsive to fault currents, electrical means for operating said contacts to engagement and circuit connections operated simultaneously with said electrical means for removing said by-pass to render said second trip magnet responsive to fault currents.

JOSEPH D. WOOD.

REFERENCES CITED

The following references are of record in the file of this patent:

UNITED STATES PATENTS

| Number | Name | Date |
|---|---|---|
| 1,781,260 | Wenzlawski | Nov. 11, 1930 |
| 1,970,140 | Healis et al. | Aug. 14, 1934 |
| 1,974,978 | Anderson | Sept. 25, 1934 |
| 2,272,752 | Spurck | Feb. 10, 1942 |
| 2,439,165 | Graves | Apr. 6, 1948 |